United States Patent [19]

Cheung et al.

[11] Patent Number: 5,973,803
[45] Date of Patent: Oct. 26, 1999

[54] COMBINED COLOR HALFTONING

[75] Inventors: Allan Chiwan Cheung; Scott Michael Heydinger, both of Lexington, Ky.

[73] Assignee: Lexmark International, Inc., Lexington, Ky.

[21] Appl. No.: 08/932,516

[22] Filed: Sep. 18, 1997

Related U.S. Application Data

[63] Continuation of application No. 08/405,101, Mar. 16, 1995, abandoned.

[51] Int. Cl.⁶ .............................. G06K 9/00; H04N 1/46
[52] U.S. Cl. ...................... 358/534; 382/162; 382/166; 358/530
[58] Field of Search ................................ 358/500, 501, 358/515, 519, 520, 523, 522, 530, 540, 537, 534; 382/252, 254, 164, 167, 166, 162; 395/131, 133, 135

[56] References Cited

U.S. PATENT DOCUMENTS

| | | | |
|---|---|---|---|
| 5,175,804 | 12/1992 | Wittmann | 395/108 |
| 5,375,002 | 12/1994 | Kim et al. | 358/521 |
| 5,394,252 | 2/1995 | Holladay et al. | 358/533 |
| 5,394,518 | 2/1995 | Friedman et al. | 395/131 |
| 5,402,245 | 3/1995 | Motta et al. | 358/298 |
| 5,469,276 | 11/1995 | Shu | 358/534 |
| 5,473,446 | 12/1995 | Perumal, Jr. et al. | 358/523 |
| 5,493,804 | 2/1996 | Harrington | 347/251 |
| 5,509,085 | 4/1996 | Kakutani | 382/167 |
| 5,611,027 | 3/1997 | Edgar | 395/131 |

*Primary Examiner*—Jerome Grant, II
*Attorney, Agent, or Firm*—John J. McArdle

[57] ABSTRACT

Halftoning algorithms such as error diffusion, blue noise mask, and void and cluster mask are known to produce visually pleasing, random, homogeneously distributed patterns of dots on output devices such as color displays or printers, for example. These algorithms are extended to take advantage of the mechanisms of each that cause a homogeneous distribution of dots of one colorant to produce a substantially homogeneous distribution of dots when using multiple colorants. The number of dots of each colorant are combined to form an output dot level number of dots that is caused to be substantially homogeneously distributed.

12 Claims, 3 Drawing Sheets

COMBINED COLOR HALFTONING

This application is a continuation of application Ser. No. 08/405,101, filed Mar. 16, 1995, now abandoned.

FIELD OF THE INVENTION

This invention relates to a method and apparatus for reproducing full-color images on output devices through electronic image processing and, more particularly, to a method and apparatus for improving the quality of the output of full-color images reproduced on output devices such as color printers and displays, for example, that reproduce colors using a comparatively small number of intensity or density levels of primary colorants by using halftoning techniques to combine the number of dots of each primary colorant so that an output display level, or dot level, is formed having the different colorant dots substantially homogeneously distributed.

BACKGROUND OF THE INVENTION

In full-color images, the color value of each pixel may be specified by 24 bits which can uniquely specify each of over 16 million different colors. These images are typically displayed on output devices such as a color printer, for example, using primary colorants having a comparatively small number of intensity or density values to produce color.

For example, an ink jet color printer commonly combines cyan, magenta, and yellow inks, and optionally black ink, in varying proportions to produce the illusion of many of these 16 million colors when viewed at a normal viewing distance. The proportions of ink are varied by placing patterns of discrete amounts of each colorant over selected areas of the printed page.

As is common for a binary ink jet or laser printer, a dot of a specific colorant can either be placed or not placed at a given pixel location in a rectangular array. This produces a pattern that may be highly visible to the human eye.

Various halftoning algorithms have previously been used to produce patterns that are pleasing to the human eye. These algorithms have been traditionally applied independently for each colorant. While this results in dot patterns for each colorant being visually pleasing, the overall pattern of the dots is not normally pleasing when dots from all of the colorants are placed on the page. This is because the distributions of dots of the two or more colorants are not selected together to be visually pleasing.

The halftoning techniques of Blue Noise Mask and Void and Cluster Mask are known as point algorithms because the decision to place or not to place dots at a specific location (x, y) on an image plane depends only upon the color values at that location. With a grayscale image system using an 8-bit value to specify the grayscale image information and printing this image on a printer with a binary black printhead, the minimum grayscale value of 0 at a specific pixel location means that a dot should not be placed at the specific pixel location, and the maximum grayscale value of 255 at a pixel location means that a dot should be placed at the specific pixel location.

Each of the Blue Noise Mask and the Void and Cluster Mask consists of a large two-dimensional table of numbers, typically 128×128 or 256×256 square pixels, which are used to halftone full color images. The mask is tiled across a document so that every pixel location has associated with it a threshold value $T(x, y)$ in the range of 0 to 255 from a mask or a matrix.

To decide whether or not to place a dot at a pixel location $(x, y)$, the grayscale value of the image at that location, $I(x, y)$, is compared against the threshold value $T(x, y)$. If $I(x, y) > T(x, y)$, a dot is placed at that location $(x, y)$; otherwise, a dot is not placed at that location. The values of $T(x, y)$ are chosen so that for any grayscale value I between 0 and 255, a pleasing pattern of dots results over a wide area provided that the masks are properly constructed.

The construction of a Blue Noise mask is discussed in "A Modified Approach to the Construction of a Blue Noise Mask," Dr. Kevin J. Parker, *Journal of Electronic Imaging*, January 1994. The construction of a Void and Cluster Mask is discussed in "Void and Cluster Halftoning Technique," Robert Ulichney, *Proceedings of the SPIE*, February 1993.

These masks have been used in several different ways to halftone color images. To correlate two colorants q and r, for example, at a pixel location $(x, y)$, the image values $I_q(x, y)$ and $I_r(x, y)$ are compared against the same threshold value $T(x, y)$. To decorrelate the two colorants q and r, one image value $I_q(x, y)$ is compared against the threshold value $T(x, y)$ in the same manner as when correlating the two colorants, but the second colorant image value is compared against a different or inverted threshold value $T(x+a, y+b)$; this implies that the original mask used to halftone the colorant q is shifted a pixels in the x direction and b pixels in the y direction to halftone the colorant r. To anticorrelate the two colorants q and r, one colorant image value $I_q(x, y)$ is compared against the threshold value $T(x, y)$ in the same manner as when correlating the two colorants, but the second colorant image value $I_r(x, y)$ is compared against a different threshold value $255-T(x, y)$.

In general, when halftoned by each of these three techniques, the pattern of dots for each individual colorant is visually pleasing. However, the pattern of dots formed by combining the dots of each of the color planes is not necessarily visually pleasing because no effort is made to insure that the dots of each of the different color planes are distributed relative to the dots of the other color planes. Examples of producing a color composed of two colorants with each of these three methods follow.

Table 1 is assumed to represent an 8×8 square pixel mask for either a Blue Noise mask or a Void and Cluster mask.

TABLE 1

| 0 | 168 | 48 | 220 | 72 | 244 | 100 | 248 |
| 84 | 148 | 116 | 20 | 228 | 12 | 152 | 60 |
| 196 | 32 | 184 | 128 | 68 | 188 | 124 | 224 |
| 56 | 216 | 112 | 44 | 200 | 96 | 36 | 172 |
| 164 | 8 | 136 | 212 | 28 | 232 | 204 | 104 |
| 108 | 180 | 80 | 160 | 88 | 132 | 4 | 236 |
| 144 | 24 | 240 | 52 | 192 | 64 | 156 | 76 |
| 252 | 92 | 140 | 120 | 16 | 208 | 40 | 176 |

A grayscale, binary, printing process forms a black and white image by either placing a dot or not placing a dot of black ink at each printable pixel location. An input value of I=0 at a pixel location $(x, y)$ represents the lightest printable color, white, which is produced by printing no dot at the location $(x, y)$. An input value of I=255 at the pixel location $(x, y)$ represents the darkest printable color black, which is produced by printing a dot at location $(x, y)$.

Shades of gray other than white or black cannot be produced at the pixel location by this printing process since at each location a dot is either printed or not printed. Therefore, the shades of gray must be simulated by printing a pattern of dots over a wider area than just one pixel.

Accordingly, an input shade of gray having a value of I is produced over a selected area by printing a dot at each location of the selected area with a probability of I/255. On average, I dots out of every 255 locations are printed. If the selected area is too small, it may be impossible to place exactly on average I dots out of 255 locations over this area. Therefore, the shade of gray is not accurately reproduced but only approximated. This accounts for much of the loss of detail of a full-color image when printed on binary devices.

It should be noted that the threshold values in Table 1 are uniformly distributed with the threshold values spaced every four units from 0 to 252. The threshold values of Table 1 can be used to govern the probability of a dot being printed.

For example, if a gray level value of I=33 is to be produced over an entire 8×8 square pixel area with the threshold values given by Table 1, nine dots will be printed at the positions having threshold values of 0, 4, 8, 12, 16, 20, 24, 28, and 32. Therefore, the gray level value of I=33 is approximated by 9 dots out of 64 where 9/64 locations is approximately equal to 33/255. The nine dots are placed at the locations marked by X in Table 2. It is assumed that Table 2 was constructed so that this pattern of nine dots is a desirable arrangement of nine dots for a gray level value of I=33.

TABLE 2

| X | | | | | | | |
|---|---|---|---|---|---|---|---|
|   |   |   | X |   | X |   |   |
|   | X |   |   |   |   |   |   |
|   | X |   |   | X |   |   |   |
|   |   |   |   |   |   |   | X |
|   | X |   |   |   |   |   |   |
|   |   |   |   | X |   |   |   |

If a color is to be produced by a two color printing process employing cyan and magenta inks, for example, the color coordinates are specified by an ordered pair (C, M) where C and M specify the relative amounts of cyan and magenta colorants, respectively, to be placed at a pixel position in a range from 0 to 255. For example, if the color I=(23, 10) is to be produced over an entire 8×8 square pixel area, the threshold values of Table 1 are used initially to produce a correlated pattern of dots to produce this color. Table 1 is used to threshold both colorants; this results in cyan dots being placed at the locations marked c and magenta dots being placed at the locations marked m in Table 3, which shows a correlated pattern of cyan and magenta dots for color (C, M)=(23, 10).

TABLE 3

| c,m | | | | | | | |
|---|---|---|---|---|---|---|---|
|   |   |   | c |   | c |   |   |
|   | c,m |   |   |   |   |   |   |
|   |   |   |   |   |   |   | c,m |
|   |   |   |   | c |   |   |   |

For this particular color, there are fewer magenta dots than cyan dots. Thus, the magenta dots are placed only at locations where there are also cyan dots when the color planes are correlated. This has the disadvantage that the blue dots, which result from placing both the cyan and magenta dots at the same pixel location, are more visually perceptible than the individual cyan or magenta dots.

If this color is produced by a decorrelated pattern of dots, the cyan dots are placed by comparing with the threshold values of Table 1 whereas the magenta dots are placed by comparing with the threshold values of Table 4, which is formed by shifting Table 1 a distance of a=4 pixels in the x direction and b=4 pixels in the y direction. The threshold values are "wrapped around" from right to left and top to bottom when shifted. Other values of a and b could be used, if desired.

TABLE 4

| 28 | 232 | 204 | 104 | 164 | 8 | 136 | 212 |
|---|---|---|---|---|---|---|---|
| 88 | 132 | 4 | 236 | 108 | 180 | 80 | 160 |
| 192 | 64 | 156 | 76 | 144 | 24 | 240 | 52 |
| 16 | 208 | 40 | 176 | 252 | 92 | 140 | 120 |
| 72 | 244 | 100 | 248 | 0 | 168 | 48 | 220 |
| 228 | 12 | 152 | 60 | 84 | 148 | 116 | 20 |
| 68 | 188 | 124 | 224 | 196 | 32 | 184 | 128 |
| 200 | 96 | 36 | 172 | 56 | 216 | 112 | 44 |

The pattern of dots resulting from thresholding the value Cyan=23 against the values in Table 1 and Magenta=10 against the values in Table 4 is shown in Table 5, which shows a decorrelated pattern of cyan and magenta dots for color (C, M)=(23, 10).

TABLE 5

| c | | | | | | | m |
|---|---|---|---|---|---|---|---|
|   |   | m |   | c |   | c |   |
|   | c |   |   |   | m |   |   |
|   |   |   |   |   |   |   | c |
|   |   |   |   | c |   |   |   |

The pattern of cyan dots is optimal since it is formed from a mask that was made to produce a pleasing pattern of dots for one colorant for any number of dots. The same is true for the pattern of magenta dots since it is formed from a shifted version of a mask that was prepared to produce a pleasing pattern of dots for one colorant, and shifting a mask with "wrap around" does not damage the ability of a mask to produce a pleasing pattern of dots. However, the pattern of dots resulting from combining the decorrelated cyan and magenta dots is not generally pleasing.

If the color I=(23, 10) is produced by an anticorrelated pattern of dots, each of the cyan dots is placed by comparing its value with the threshold value T(x, y) while each of the magenta dots is placed by comparing its value with the threshold value T'(x, y)=255−T(x, y). Since this example uses a small 8×8 square pixel mask and the largest value in this small mask is 252, the threshold values of T'(x, y) are formed by subtracting the threshold values T(x, y) from 252 instead of 255. The threshold values of T(x, y) are shown in Table 1, and the threshold values T'(x, y) are shown in Table 6.

TABLE 6

| 252 | 184 | 204 | 32 | 180 | 8 | 152 | 4 |
|---|---|---|---|---|---|---|---|
| 168 | 104 | 136 | 232 | 24 | 240 | 100 | 192 |
| 56 | 220 | 8 | 124 | 184 | 64 | 128 | 28 |
| 196 | 36 | 140 | 208 | 52 | 156 | 216 | 80 |
| 88 | 244 | 116 | 40 | 224 | 20 | 48 | 148 |
| 144 | 72 | 172 | 92 | 164 | 120 | 248 | 16 |
| 108 | 228 | 12 | 200 | 60 | 188 | 96 | 176 |
| 0 | 160 | 112 | 132 | 236 | 44 | 212 | 76 |

The pattern of dots resulting from thresholding the value of cyan=23 with Table 1 and the value of magenta=10 with Table 6 is shown in Table 7, which shows an anticorrelated pattern of cyan and magenta dots for color (C, M)=(23, 10).

TABLE 7

| c |   |   | m | m |
|---|---|---|---|---|
|   | c | c |   |   |
|   |   |   |   | c |
| m |   | c |   |   |

Although the individual cyan and magenta dot patterns will again be pleasing, the combined pattern of dots produced by combining the anticorrelated cyan and magenta dots is not generally pleasing.

The halftoning technique of error diffusion is generally attributed to Robert Floyd and Louis Steinberg as set forth in "An Adaptive Algorithm for Spatial Gray Scale," 1975 *SID International Symposium, Digest of Technical Papers*, pp. 36–37. This algorithm is unlike the Blue Noise mask and the Void and Cluster mask in that the decision to place or not to place a dot at a given location (x, y) depends on the image values at other pixel locations.

If a black-and-white image having image values of I(x, y) is to be printed on a binary printer, assume that each pixel has associated with it a threshold value T which is invariant for x and y values. If I(x, y) equals only either 0 or 255, the image can be reproduced as intended since not printing a dot corresponds to printing a value of I=0 while printing a dot corresponds to printing a value of I=255.

The problem occurs when I(x, y) is not equal to 0 or 255 for some x and y location; this is usually the situation with items such as photographs, for example. In this situation, printing or not printing a dot causes there to be an error from the intended colorant value. If a dot is placed at a position (x, y), an error equal to the amount of 255−I(x, y) is generated at the position (x, y). If a dot is not placed, an error equal to the amount I(x, y) is generated at the position (x, y).

The error diffusion algorithm calculates the error at a specific position as the result of quantization and diffuses this error to neighboring dots. If a dot is printed at the position (x, y), some amount of the error is subtracted from neighboring dots to decrease their probability of being printed to compensate for overprinting at the position (x, y). Similarly, if a dot is not printed at the position (x, y), some amount of the error is added to neighboring dots to increase their probability of being printed to compensate for underprinting at the position (x, y). The algorithm proposed by Floyd and Steinberg spreads 7/16 of the error generated at the position or location (x, y) to a location (x+1, y), 3/16 to a location (x−1, y+1), 5/16 to a location (x, y+1), and 1/16 to a location (x+1, y+1).

When the value I(x, y) is between 0 and 255, this value can be thought of as the number of dots out of 255 to printed. If I(x, y) is constant over a wide area, on average, I(x, y) dots out of 255 will be printed in this area.

Numerous enhancements have been suggested to enhance the output quality of error diffusion. These include varying the threshold value by some amount as a function of x and y, varying the order in which pixels are quantized, and varying the amount of error spread to neighboring pixels as well as the choice of pixels to which the error is spread. Additionally, error diffusion has been extended to output devices that can produce multiple levels of a given colorant.

When used to print color images, the Blue Noise mask, the Void and Cluster mask, and the error diffusion technique have traditionally been applied independently to individual color planes. As previously mentioned for the Blue Noise mask and the Void and Cluster mask, individual color planes can have pleasing patterns of dots, but the combined dot pattern from multiple color planes is not generally pleasing.

Traditional color error diffusion for a two color printing process using cyan and magenta dots can be expressed as follows:

```
if (Cyan(x, y) + Cyan Error(x, y) > Threshold)
{
    print Cyan dot
    CError = 255 − (Cyan(x, y) + Cyan Error(x, y))
}
else
{
    CError = 0 − (Cyan(x, y) + Cyan Error(x, y))
}
Cyan Error(x + 1, y) = Cyan Error(x + 1, y) − CError * 7/16
Cyan Error(x − 1, y + 1) = Cyan Error(x − 1, y + 1) − CError * 3/16
Cyan Error(x, y + 1) = Cyan Error(x, y + 1) − CError * 5/16
Cyan Error(x + 1, y + 1) = Cyan Error(x + 1, y + 1) − CError * 1/16
if (Magenta(x, y) + Magenta Error(x, y) > Threshold)
{
    print Magenta dot
    MError = 255 − (Magenta(x, y) + Magenta Error(x, y))
}
else
{
    MError = 0 − (Magenta(x, y) + Magenta Error(x, y))
}
Magenta Error(x + 1, y) = Magenta Error(x + 1, y) − MError * 7/16
Magenta Error(x − 1, y + 1) = Magenta Error(x − 1, y + 1) − MError * 3/16
Magenta Error(x, y + 1) = Magenta Error(x, y + 1) − MError * 5/16
Magenta Error(x + 1, y + 1) = Magenta Error(x + 1, y + 1) − MError * 1/16
```

U.S. Pat. No. 5,210,602 to Mintzer describes a method of coupled-color error diffusion involving communication between several color planes of a color printing process. A first color plane is processed as previously described. That is, the sum of the input colorant value for the first color plane at a position (x, y) and the error propagated in the same plane to the pixel at the same position (x, y) is generated and sent to a quantizer which chooses an output pixel value closest to this sum. After quantization of the pixel at the location (x, y) in the first color plane, an error value is computed and propagated to neighboring pixels in the first color plane.

A second color plane is processed in a similar manner in that the sum of the original colorant value for the second colorant at a position (x, y) and the error propagated in the same color plane to the pixel at the same location (x, y) is generated as before, but some fraction of the error at the position (x, y) in the first color plane is added to this sum prior to quantization. If a dot is placed at the position (x, y) in the first color plane, the fraction of the error generated at this position in the first color plane and passed to the second color plane has the effect of reducing the probability of printing a dot in the second color plane at this position. If a dot is not placed at the position (x, y) in the first color plane, the fraction of the error generated at this position in the first color plane and passed to the second color plane has the effect of increasing the probability of printing a dot in the second color plane at this position.

This method fails to employ the mechanisms of error diffusion that produce a pleasing pattern of some number of dots in a single color plane to produce a pleasing pattern of some number of dots that reside in multiple color planes. The algorithm in the aforesaid Mintzer patent fails to take into consideration the total number of dots to be placed when processing the first color plane. Thus, when processing the second color plane, quantization is biased by results from the first color plane, but the first color plane is processed without any influence from the second color plane. That is, the dots are placed optimally in the first color plane for the first color plane only without regard to the overall pattern of dots to be produced in the multiple color planes.

SUMMARY OF THE INVENTION

The present invention overcomes the foregoing problems by considering the combined number of dots from the color planes when determining the number of dots of each of the color planes and their locations for the output pattern to be made visually pleasing.

This invention eliminates the disadvantage of placing dots of different colors on top of one another with correlated color halftoning as shown in Table 3 or the disadvantage of the displeasing combined pattern of cyan and magenta dots that results from decorrelated or anticorrelated color halftoning as shown in Tables 5 and 7, respectively. In each of Tables 5 and 7, the six cyan dots and the three magenta dots were placed for a total of nine dots.

Table 2 shows a visually pleasing pattern of nine dots, none of which is placed in the same pixel location. If it is desired to produce the color having a value of 33 (the sum of C=23 and M=10) of six cyan dots and three magenta dots, a pleasing pattern of nine dots is formed by comparing a value of 33 (the sum of C=23 and M=10) with each of the threshold values of the matrix.

When producing the color (C, M)=(23, 10), the output dot level 33 could be formed by adding the values C and M. This enables a decision to be made as to where each of the total of the nine cyan and magenta dots should be placed and leaves only determination at which of these nine locations that the six cyan dots and the three magenta dots are to be placed. The six cyan dots are placed by comparing the cyan colorant value against the threshold matrix of Table 1, and the three magenta dots are located at the remaining positions of the nine at which cyan dots were not placed. The resulting, visually pleasing pattern of six cyan and three magenta dots pattern is shown in Table 8.

TABLE 8

| c | | | | |
|---|---|---|---|---|
|   |   | c |   | c |
| m |   |   |   |   |
| c |   |   | m |   |
|   |   |   |   | c |
| m |   |   |   |   |
|   |   | c |   |   |

If the total number of the cyan and magenta dots is larger than 255, some of the cyan and magenta dots must be placed at the same location and form blue dots. If the resulting blue dots are more visually perceptible than the individual cyan dot or the individual magenta dot, it is desired to produce a pleasing pattern of these blue dots.

In a manner similar to that just described, B, the number of the blue dots is compared to the threshold values of Table 1. Wherever the value of B is greater than the threshold value, both a cyan dot and a magenta dot are placed.

The number of pixels at which only the cyan dots are to be placed is C' where C'=C−B, and the number of pixels at which only the magenta dots are to be placed is M' where M'=M−B. To fill in the remaining pixels, the cyan dots are placed only wherever the value C is greater than the threshold values of Table 1 and a blue dot is not placed. The magenta dots are placed in the remaining vacant pixel locations . This causes a total of C cyan dots to be placed with B of the cyan dots being placed with the magenta dots and C' of the cyan dots being placed alone. A total of M magenta dots also will be placed, B of which are also placed with the cyan dots and M' of which are placed alone.

Accordingly, this invention eliminates the disadvantages of the previously available mechanisms of error diffusion for printing colors.

An object of this invention is to combine different halftoned color planes in a visually pleasing arrangement.

Another object of this invention is to provide an apparatus and method for producing a halftoned color image.

Other objects of this invention will be readily perceived from the following description, claims, and drawings.

DETAILED DESCRIPTION OF PREFERRED EMBODIMENTS

Figure 1:
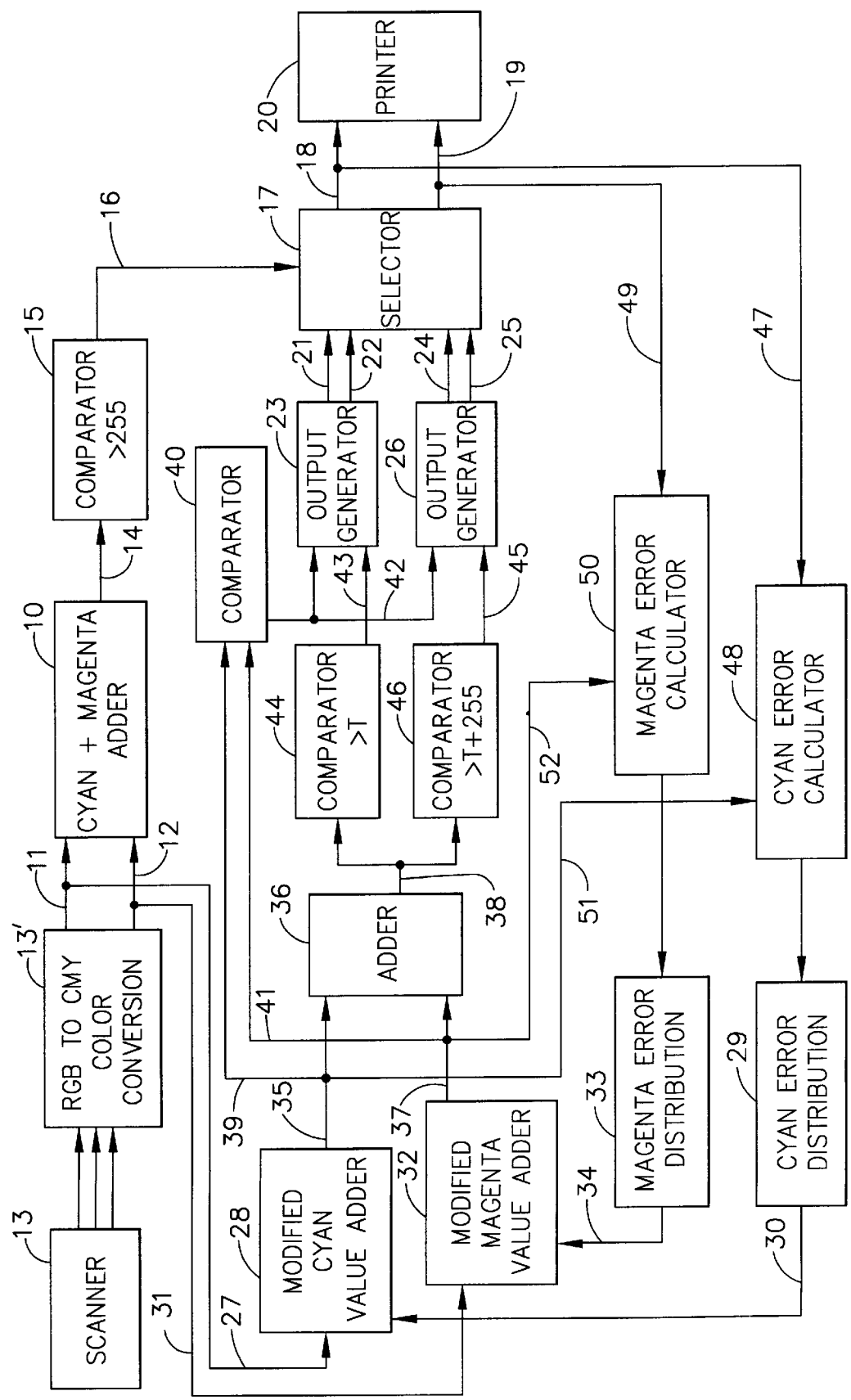
FIG. 1 is a schematic diagram of an apparatus of the present invention using the error diffusion technique with two color planes.

The present invention uses a technique which is called combined color halftoning. This technique takes advantage of the mechanisms of any halftoning algorithm such as error diffusion or Blue Noise mask or Void and Cluster mask, for example, that produces a visually pleasing pattern of Q dots of one colorant for various values of Q to produce a pleasing pattern of dots of multiple colorants.

This invention computes an output dot level which represents the total number of pixel locations at which colorants are to be placed in a visually pleasing dot pattern. If an area of a document is to be printed with a given cyan colorant value C and a given magenta colorant value M, such that $0 <= C, M <= 255$. The values C and M may be interpreted as the number of pixel locations out of 255, on average, at which the cyan and magenta colorants are to be placed.

If the sum of $C+M <= 255$, some of the 256 pixel positions will have no colorant placed there. Since the total number of dots of the cyan and magenta colorants to be placed on the document is less than or equal to the number of pixel positions in which to place these dots, it is possible to place no more than one of the cyan or magenta dots at a given pixel location and still place the desired total amount of dots. Although it is possible to place both of the colorants at a given pixel position to form a secondary color, this is disadvantageous in that a combination of the cyan and magenta dots is darker than the individual primary cyan or magenta dot so that the combination is more visually perceptible.

When $C+M <= 255$, the halftoning algorithm is directed to produce a pleasing pattern of Q dots=C+M dots. A given halftone algorithm is extended to arbitrate or select among the Q dots as to which are to be cyan dots and which are to be magenta dots.

If the sum of C+M>255, then at least C+M−255 pixel positions must have both colorants placed there. With C+M>255, it is desirable to place at least one colorant at each pixel location since a vacant pixel appears light and is visually perceptible.

As previously mentioned, the secondary dots will be more visually perceptible than the individual cyan or magenta dots. Therefore, it is desirable to make the pattern of Q=C+M−255 secondary dots visually uniform and to place at least one primary colorant at any pixel location at which the secondary dots are not placed. A given halftone algorithm is extended to place both the C and M colorants at Q pixel locations and arbitrate among the remaining pixel positions of C+M−Q as to which are to be cyan dots and which are to be magenta dots.

Color printers use three different colored inks, cyan, magenta, and yellow, for example, to produce colors. These three inks are called subtractive primaries; and when these inks are mixed in the proper proportions, they produce a much wider variety of colors.

At any given pixel position, a binary printer can place any of eight possible combinations of these three colorants. To produce a red dot, magenta and yellow dots are placed at the given position. To produce a green dot, cyan and yellow dots are placed. To produce a blue dot, cyan and magenta dots are placed. Red, green, and blue dots are called subtractive secondary colors because each is made up of two dots of subtractive primary colors.

A color printer also can produce black at a given pixel position by placing one dot of each of cyan, magenta, and yellow. When black is produced in this manner, the resulting black dot is called a process black dot.

Therefore, the secondary colors and process black are dependent on one another. For example, cyan and magenta inks might be chosen to optimize the appearance of blue. The cyan ink that produces the best blue may not be the same cyan ink that produces the best green. Typically, the process black ink suffers the worst because its appearance depends on the chemistry of all three primary inks. Process black dots are rarely as dark as desired and often have a reddish or greenish tint to them.

For this reason, printer manufacturers typically employ a fourth ink, black, in addition to the primary inks. A black dot produced with this ink is known as a true black dot.

A true black dot can be made to appear more pleasing since it is not formed from the three other inks. The chemistry of black ink can be optimized independently of the three other inks to produce dark black dots without the reddish or greenish tint that the process black dots possess.

When a pixel position in a document is to be made black, the dot can be produced by placing either a process black dot or a true black dot on the document. For this reason, the black ink is called a redundant ink. Printers can use red, green, blue, or other redundant inks as well.

Halftoning algorithms are used to decide when to use true black ink. These algorithms are given color coordinates as cyan, magenta, and yellow triples (C, M, Y) where the values of C, M, and Y are in the range of 0 to 255 and specify the relative amounts of cyan, magenta, and yellow inks to be placed over a specified area of a page of a document.

A halftoning algorithm places C cyan dots, M magenta dots, and Y yellow dots on average out of 255 dots over the specified area. In general, depending on the halftoning algorithm and the values of C, M, and Y, the individual cyan, magenta, and yellow dots may or may not be placed at the same pixel location without significantly affecting the perceived color of the specified area.

Consider the example in which C=10, M=5, and Y=7. Since a true black dot is considered equivalent to one dot of each of cyan, magenta, and yellow, this color can be produced by printing ten cyan dots, five magenta dots, and seven yellow dots, or by nine cyan dots, four magenta dots, six yellow dots, and one true black dot. This example enables replacement of up to five dots of each of cyan, magenta, and yellow with five true black dots.

Six or more true black dots can not be used because there are only five magenta dots. The number of true black dots that can be substituted is regulated by the minimum value, known as the gray component, of the three color coordinates C, M, and Y.

The number of true black dots printed is K'=minimum(C, M, Y). Since some of the original cyan, magenta, and yellow dots are being replaced by true black dots, fewer of the cyan, magenta, and yellow dots (C', M', Y') must be printed where C'=C−K', M'=M−K', and Y'=Y−K'.

Therefore, the four color printing process color coordinates are (C', M', Y', K'). This means that C' cyan dots, M' magenta dots, Y' yellow dots, and K' true black dots are to be printed over the specified area.

The number of other redundant colorants to be used can be computed in a similar manner. Additionally, even though as many as K' of each of the cyan, magenta, and yellow dots can be replaced by true black dots, there is no reason that this number of the cyan, magenta, and yellow dots must be replaced by the redundant colorant. A number of each of the cyan, magenta, and yellow dots less than this value can be replaced. Regardless, the visual pattern of dots, which results from selection of how many drops of each colorant are used, is desired to be visually pleasing.

This invention also can be extended, if desired, to allow the use of secondary dots instead of actual redundant inks. Secondary dots are produced with more than one primary colorant.

In each of first and second embodiments, this invention is applied to two color planes, namely, cyan and magenta. Yellow is omitted because yellow dots are typically much lighter than cyan or magenta dots so that they are less visually perceptible than cyan or magenta dots. This invention may be extended, if desired, to include a yellow color plane.

In the first embodiment, an error diffusion halftoning method is used. The error diffusion method to be disclosed operates on a combination of the cyan and magenta input signals, while the yellow input signal is separately processed. Advantageously, a less computationally-complex binarization of the yellow input signal may be performed. For example, a threshold matrix may be used for the yellow binarization. In the second embodiment, a Blue Noise Mask or Void and Cluster Mask halftoning method is used.

In the first embodiment, which employs an error diffusion like algorithm, the input signals of a color image are processed by the following steps although some variation in the order will still produce the same results:

```
if (Cyan(x, y) + Magenta(x, y) <= 255)
{
    /* Print at most one dot */
    if (Cyan(x, y) + Cyan Error(x, y) + Magenta(x, y) + Magenta
        Error(x, y) > Threshold)
```

-continued

```
    {
        if (Cyan(x, y) + Cyan Error(x, y) > Magenta(x, y) +
            Magenta Error(x, y))
        {
            print Cyan dot only
            CError = 255 - (Cyan(x, y) + Cyan Error(x, y))
            MError = 0 - (Magenta(x, y) + Magenta Error(x, y))
        }
        else
        {
            print Magenta dot only
            MError = 255 - (Magenta (x, y) + Magenta
                Error(x, y))
            CError = 0 - (Cyan(x, y) + Cyan Error(x, y))
        }
    }
    else
    {
        CError = 0 - (Cyan(x, y) + Cyan Error(x, y))
        MError = 0 - (Magenta(x, y) + Magenta Error(x, y))
    }
}
else
{
    /* Print at least one dot */
    if (Cyan(x, y) + Cyan Error(x, y) + Magenta(x, y) + Magenta
        Error(x, y) - 255 > Threshold)
    {
        print Cyan and Magenta dots
        CError = 255 - (Cyan(x, y) + Cyan Error(x, y))
        MError = 255 - (Magenta (x, y) + Magenta Error(x, y))
    }
    else
    {
        if (Cyan(x, y) + Cyan Error(x, y) > Magenta(x, y) +
            Magenta Error(x, y))
        {
            print Cyan dot only
            CError = 255 - (Cyan(x, y) + Cyan Error(x, y))
            MError = 0 - (Magenta(x, y) + Magenta Error(x, y))
        }
        else
        {
            print Magenta dot only
            MError = 255 - (Magenta(x, y) + Magenta
                Error(x, y))
            CError = 0 - (Cyan(x, y) + Cyan Error(x, y))
        }
    }
}
Cyan Error(x + 1, y) = Cyan Error(x + 1, y) - CError * 7/16
Cyan Error(x - 1, y + 1) = Cyan Error(x - 1, y + 1) -
CError * 3/16
Cyan Error(x, y + 1) = Cyan Error(x, y + 1) - CError * 5/16
Cyan Error(x + 1, y + 1) = Cyan Error(x + 1, y + 1) -
CError * 1/16
Magenta Error(x + 1, y) = Magenta Error(x + 1, y) - MError * 7/16
Magenta Error(x - 1, y + 1) = Magenta Error(x - 1, y + 1) -
MError * 3/16
Magenta Error(x, y + 1) = Magenta Error(x, y + 1) - MError * 5/16
Magenta Error(x + 1, y + 1) = Magenta Error(x + 1, y + 1) -
MError * 1/16
```

An apparatus for carrying out the first embodiment is shown in FIG. 1. The apparatus includes a cyan and magenta adder 10 receiving a full-color initial density or intensity value for cyan supplied over an input line 11 and a full-color initial intensity value for magenta supplied over an input line 12.

The two inputs on the lines 11 and 12 for cyan and magenta, respectively, are supplied from a scanner 13, which scans a color document, through a RGB (red, green, blue) to CMY (cyan, magenta, yellow) color conversion 13'. One suitable example of this type of structure is shown in U.S. Pat. No. 5,031,050 to Chan.

Each of the full-color initial intensity values has a range between 0 and 255. The full color yellow (Y) signal is binarized independently of the other full color signals using a threshold matrix (not shown), and the binarized signal is coupled to the printer 20. The values of the cyan and magenta inputs are added together by the adder 10, which supplies a total nonmodified pixel value on its output line 14. This sum on the output line 14 of the adder 10 is supplied to a comparator 15, which compares the sum on the output line 14 of the adder 10 to the value of 255.

An output selection line 16 from the comparator 15 has a binary signal with its state indicating if the total nonmodified pixel value on the line 14 is less than or equal to the value of 255 or is greater than 255. The state of the binary selection signal on the output line 16 controls a selector 17 having output lines 18 and 19 as inputs to an output device such as a color printer 20, for example.

Inputs to the selector 17 from output lines 21 and 22 of an output generator 23 and from output lines 24 and 25 of an output generator 26 determine whether at most one of the cyan and magenta dots is printed by the color printer 20 or whether at least one, if not both, of the cyan and magenta dots is printed by the color printer 20.

The input line 11 has a line 27 connected to a modified cyan value adder 28, which also receives an input from a cyan error distribution buffer 29 through its output line 30. The input line 12 has a line 31 connected to a modified magenta value adder 32, which also receives an input from a magenta error distribution buffer 33 through its output line 34.

The adder 28 supplies a modified pixel value for cyan on its output line 35, which is connected to an adder 36. The adder 32 supplies a modified pixel value for magenta on its output line 37, which is connected to the adder 36. The adder 36 supplies the total modified pixel value (the sum of the cyan modified pixel value and the magenta modified pixel value) on its output line 38.

The modified pixel intensity values are used to determine where to place at most one of the cyan and magenta dots when it is desired to place at most one dot at the specific pixel location according to the total nonmodified pixel value or where to place one of each of the cyan and magenta dots at the specific pixel location when it is desired to place at least one of the cyan and magenta dots at the specific pixel location according to the total nonmodified pixel value. The modified pixel intensity values also are used to determine which of the cyan dot or the magenta dot, but not both, is to be placed at the specific pixel location when it is desired to place either the cyan dot or the magenta dot but not both.

The output line 35 of the adder 28 is connected by a line 39 to a comparator 40. The output line 37 of the adder 32 is connected by a line 41 to the comparator 40.

The modified pixel intensity values of cyan and magenta are compared by the comparator 40 to determine the state of a binary signal on its output line 42. The state of the binary signal on the output line 42 of the comparator 40 is used when it has been determined for the specific pixel location that only one of the cyan and magenta dots is to be placed at the specific pixel location. If the modified pixel intensity value for cyan is greater than the modified magenta pixel intensity value, a cyan dot is placed at the specific pixel location; otherwise., a magenta dot is placed at the specific pixel location.

If the total nonmodified pixel value on the output line 14 is less than or equal to 255 at the specific pixel location, then a maximum of only one dot is to be placed at the specific pixel location. The output generator 23 then generates a binary signal on each of the lines 21 and 22.

The state of each of these two binary signals indicates which, if either, of the cyan dot or the magenta dot is to be placed at the specific pixel location. If the state of a binary signal on an output line 43 of a comparator 44 indicates that the total modified pixel value on the output line 38 of the adder 36 is less than the threshold value T, the states of the binary signals on the output lines 21 and 22 of the output generator 23 indicate that neither the cyan dot nor the magenta dot is to be placed at the specific pixel location. Otherwise, the states of the binary signals on the output lines 21 and 22 of the output generator 23 indicate which one of the cyan dot and the magenta dot is to be placed at the specific pixel location according to the state of the binary signal on the output line 42 of the comparator 40 since it is the second input to the output generator 23.

If the total nonmodified pixel value is greater than 255 for the specific pixel location, at least one of the cyan and magenta dots is to be placed at the specific pixel location. The output generator 26 generates a binary signal on each of the output lines 24 and 25. The states of the two binary signals determine whether the cyan dot or the magenta dot is to be placed at the specific pixel location or whether both the cyan and magenta dots are to be placed at the specific pixel location.

If an output line 45 of a comparator 46 indicates that the total modified pixel value on the output line 38 of the adder 36 is greater than the sum of the threshold value T plus 255, the states of the binary signals on the output lines 24 and 25 of the output generator 26 indicate that both the cyan and magenta dots are to be placed at the specific pixel location. Otherwise, the states of the binary signals on the output lines 24 and 25 of the output generator 26 indicate whether the cyan dot or the magenta dot is to be placed at the specific pixel location according to the state of the binary signal on the output line 42 of the comparator 40.

The output line 18 of the selector 17 is connected by a line 47 to a cyan error calculator 48. The output line 19 of the selector 17 is connected by a line 49 to a magenta error calculator 50.

The cyan error calculator 48 has the output line 35 of the adder 28 connected thereto by a line 51 so that the modified pixel intensity value for cyan for the specific pixel location is an input to the cyan error calculator 48. When the output line 18 of the selector 17 indicates that the cyan dot is not to be printed, the state of the binary signal on the line 47 causes the cyan error calculator 48 to supply the modified pixel intensity value for cyan to the cyan error distribution buffer 29.

When the state of the binary signal on the output line 18 of the selector 17 indicates that the cyan dot is to be printed, the modified pixel intensity value for cyan is subtracted from 255 by the cyan error calculator 48. The difference is supplied from the cyan error calculator 48 to the cyan error distribution buffer 29.

The magenta error calculator 50 has the output line 37 of the adder 32 connected thereto by a line 52 so that the modified pixel intensity value for magenta for the specific pixel location is an input to the magenta error calculator 50. When the output line 19 of the selector 17 indicates that the magenta dot is not to be printed, the state of the binary signal on the line 49 causes the magenta error calculator 50 to supply the modified pixel intensity value for magenta to the magenta error distribution buffer 33.

When the state of the binary signal on the output line 19 of the selector 17 indicates that the magenta dot is to be printed, the modified pixel intensity value for magenta is subtracted from 255 by the magenta error calculator 50. The difference is supplied from the magenta error calculator 50 to the magenta error distribution buffer 33.

In the second embodiment, the input signals of a color image are processed where T(x, y) is the threshold value at the pixel location (x, y) from a threshold table such as a Blue Noise Mask or Void and Cluster Mask by the following steps although some variation in the order will still produce the same results:

```
if (Cyan(x, y) + Magenta(x, y) <= 255)
{
    /* Print at most one dot */
    if (Cyan(x, y) > T(x, y))
    {
        print Cyan dot only
    }
    else if (Cyan(x, y) + Magenta(x, y) > T(x, y))
    {
        print Magenta dot only
    }
}
else
{
    /* Print at least one dot */
    if (Cyan(x, y) + Magenta(x, y) - 255 > T(x, y))
    {
        print Cyan and Magenta dots
    }
    else if (Cyan(x, y) > T(x, y))
    {
        print Cyan dot only
    }
    else
    {
        print Magenta dot only
    }
}
```

In each of third and fourth embodiments, three color planes, namely, cyan, magenta, and black are utilized with the black colorant derived from the cyan, magenta, and yellow color coordinates. The third and fourth embodiments may be extended, if desired, to include a yellow color plane.

In the third embodiment, an error diffusion halftoning method is employed. In the fourth embodiment, a Blue Noise Mask halftoning method or a Void and Cluster Mask halftoning method is used.

In the third embodiment in which an error diffusion like algorithm is employed, the input signals of a color image are processed in order by the following steps although some variation in the order will still produce the same results:

```
Black(x, y) = minimum[Cyan(x, y), Magenta(x, y), Yellow(x, y)]
Cyan(x, y) = Cyan(x, y) - Black(x, y)
Magenta(x, y) = Magenta(x, y) - Black(x, y)
Yellow(x, y) = Yellow(x, y) - Black(x, y)
if (Cyan(x, y) + Magenta(x, y) + Black(x, y) <= 255)
{
    /* Print at most one dot */
    if (Cyan(x, y) + Cyan Error(x, y) + Magenta(x, y) + Magenta
        Error(x, y) + Black(x, y) + Black Error(x, y) >
        Threshold)
    {
        if (Cyan(x, y) + Cyan Error(x, y) > Magenta(x, y) +
            Magenta Error(x, y) and Cyan(x, y) + Cyan
            Error(x, y) > Black(x, y) + Black Error(x, y))
        {
            print Cyan dot only
            CError = 255 - (Cyan(x, y) + Cyan Error(x, y))
            MError = 0 - (Magenta(x, y) + Magenta Error(x, y))
            KError = 0 - (Black(x, y) + Black Error(x, y))
```

```
            }
        else if (Magenta(x, y) + Magenta Error(x, y) >
                Cyan(x, y) + Cyan Error(x, y) and
                Magenta(x, y) + Magenta Error(x, y) > Black(x, y) +
                    Black Error(x, y)
            {
                print Magenta dot only
                MError = 255 - (Magenta(x, y) + Magenta
                    Error(x, y))
                CError = 0 - (Cyan(x, y) + Cyan Error(x, y))
                KError = 0 - (Black(x, y) + Black Error(x, y))
            }
            else
            {
                print Black dot only
                KError = 255 - (Black(x, y) + Black Error(x, y))
                CError = 0 - (Cyan(x, y) + Cyan Error(x, y))
                MError = 0 -(Magenta(x, y) + Magenta Error(x, y))
            }
        }
    else
    {
        CError = 0 - (Cyan(x, y) + Cyan Error(x, y))
        MError = 0 - (Magenta(x, y) + Magenta Error(x, y))
        KError = 0 - (Black(x, y) + Black Error(x, y))
    }
}
else
{
    /* Print at least one dot */
    if (Cyan(x, y) + Cyan Error(x, y) + Magenta(x, y) + Magenta
        Error(x, y) + Black(x, y) + Black Error(x, y) - 255 >
        Threshold)
    {
        print Cyan and Magenta dots
        CError = 255 - (Cyan(x, y) + Cyan Error(x, y))
        MError = 255 - (Magenta(x, y) + Magenta Error(x, y))
        KError = 0 - (Black(x, y) + Black Error(x, y))
    }
    else
    {
        if (Cyan(x, y) + Cyan Error(x, y) > Magenta(x, y) +
            Magenta Error(x, y) and Cyan(x, y) + Cyan
            Error(x, y) > Black(x, y) + Black Error(x, y))
        {
            print Cyan dot only
            CError = 255 - (Cyan(x, y) + Cyan Error(x, y))
            Merror = 0 - (Magenta(x, y) + Magenta Error(x, y))
            Kerror = 0 - (Black(x, y) + Black Error(x, y))
        }
        else if (Magenta(x, y) + Magenta Error(x, y) >
                Cyan(x, y) + Cyan Error(x, y) and
                Magenta(x, y) + Magenta Error(x, y) >
                Black(x, y) + Black Error(x, y))
        {
            print Magenta dot only
            Merror = 255 - (Magenta(x, y) + Magenta
                Error(x, y))
            Cerror = 0 - (Cyan(x, y) + Cyan Error(x, y))
            Kerror = 0 - (Black(x, y) + Black Error(x, y))
        }
        else
        {
            print Black dot only
            Kerror = 255 - (Black(x, y) + Black Error(x, y))
            Cerror = 0 - (Cyan(x, y) + Cyan Error(x, y))
            Merror = 0 - (Magenta(x, y) + Magenta Error(x, y))
        }
    }
}
Cyan Error(x + 1, y) = Cyan Error(x + 1, y) - CError * 7/16
Cyan Error(x - 1, y + 1) = Cyan Error(x - 1, y + 1) -
CError * 3/16
Cyan Error(x, y + 1) = Cyan Error(x, y + 1) - CError * 5/16
Cyan Error(x + 1, y + 1) = Cyan Error(x + 1, y + 1) -
CError * 1/16
Magenta Error(x + 1, y) = Magenta Error(x + 1, y) - MError * 7/16
Magenta Error(x - 1, y + 1) = Magenta Error(x - 1, y + 1) -
MError * 3/16
Magenta Error(x, y + 1) = Magenta Error(x, y + 1) - MError * 5/16
```

```
Magenta Error(x + 1, y + 1) = Magenta Error(x + 1, y + 1) -
MError * 1/16
Black Error(x + 1, y) = Black Error(x + 1, y) - KError * 7/16
Black Error(x - 1, y + 1) = Black Error(x - 1, y + 1) -
KError * 3/16
Black Error(x, y + 1) = Black Error(x, y + 1) - KError * 5/16
Black Error(x + 1, y + 1) = Black Error(x + 1, y + 1) -
KError * 1/16
```

In the fourth embodiment, the input signals of a color image are processed where $T(x, y)$ is the threshold value at the pixel location $(x, y)$ from a threshold table such as a Blue Noise Mask or Void and Cluster Mask by the following steps although some variation in the order will still produce the same results:

```
Black(x, y) = minimum[Cyan(x, y), Magenta(x, y), Yellow(x, y)]
Cyan(x, y) = Cyan(x, y) - Black(x, y)
Magenta(x, y) = Magenta(x, y) - Black(x, y)
Yellow(x, y) = Yellow(x, y) - Black(x, y)
if (Cyan(x, y) + Magenta(x, y) + Black(x, y) <= 255)
{
    /* Print at most one dot */
    if (Cyan(x, y) > T(x, y))
    {
        print Cyan dot only
    }
    else if (Cyan(x, y) + Black(x, y) > T(x, y))
    {
        print Black dot only
    }
    else if (Cyan(x, y) + Magenta(x, y) + Black(x, y) > T(x, y))
    {
        print Magenta dot only
    }
}
else
{
    /* Print at least one dot */
    /* Note: The number of blue pixel locations (places where
        both cyan and magenta inks are placed) is Cyan +
        Magenta + Black - 255. */
    if (Cyan(x, y) + Magenta(x, y) + Black(x, y) - 255 >
        T(x, y))
    {
        print both Cyan and Magenta dots
    }
    else if (Cyan(x, y) > T(x, y))
    {
        print Cyan dot only
    }
    else if (Cyan(x, y) + Black(x, y) > T(x, y))
    {
        print Black dot only
    }
    else
    {
        print Magenta dot only
    }
}
```

Figure 2:
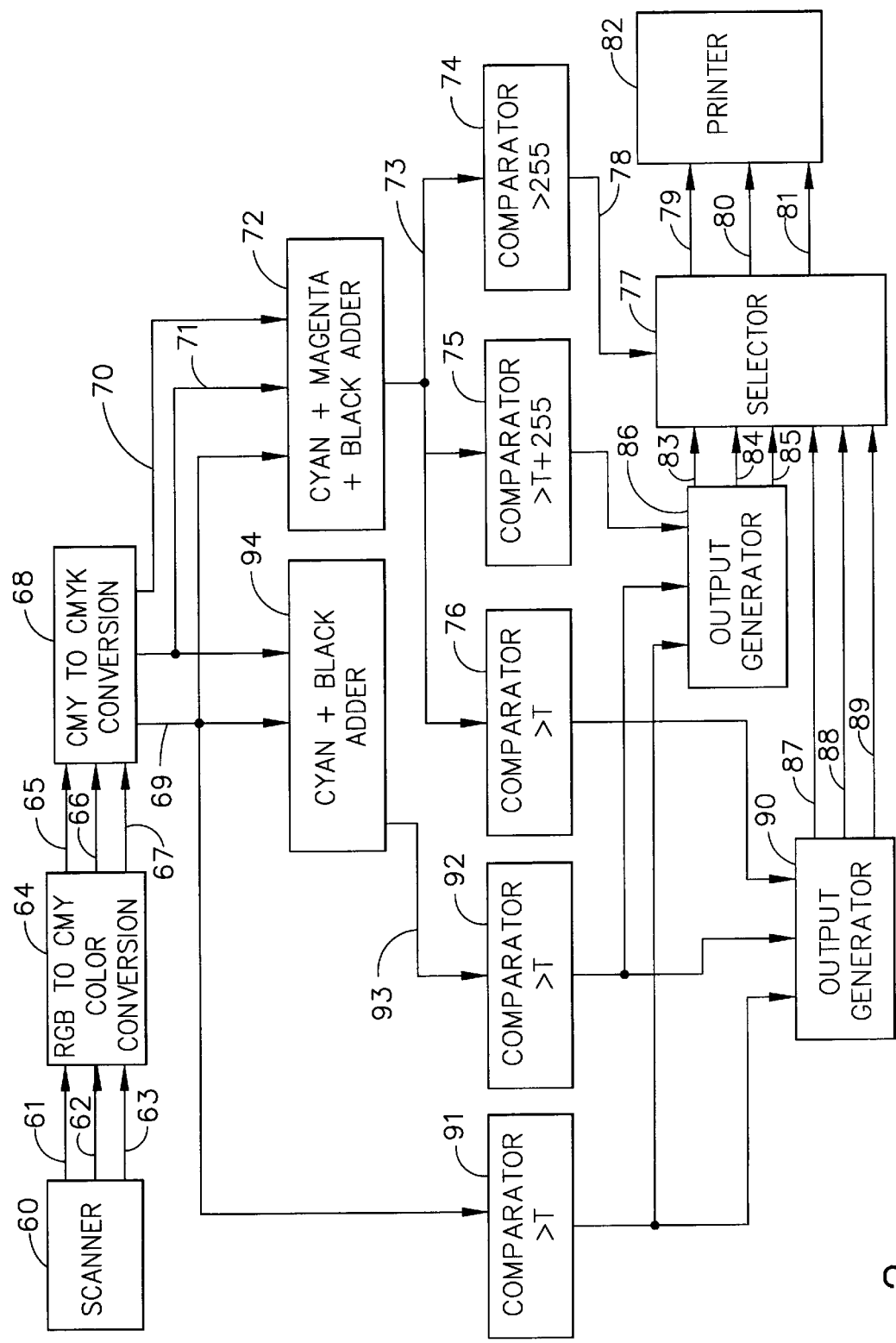
FIG. 2 is a schematic diagram of an apparatus of the present invention using the Blue Noise Mask or Void and Cluster Mask technique with three color planes.

An apparatus for carrying out the fourth embodiment is shown in FIG. 2. The apparatus includes a full color scanner 60 having output lines 61, 62, and 63 on which the full color scanner 60 generates red, green, and blue (RGB) full color signals, respectively.

An RGB to CMY color conversion function 64 converts the RGB signals to full color cyan (C), magenta (M), and yellow (Y) signals on output lines 65, 66, and 67, respectively. The black component (K) is generated and removed from the CMY signals by a CMY to CMYK conversion means 68, which is known as an undercolor removal apparatus, to form modified full color CMK (cyan, magenta, and black) signals on its output lines 69, 70, and 71, respectively. The full color CMK signals are used to generate binary output signals in a combined fashion, as shall be described subsequently. The full color yellow (Y) signal is binarized independently of the other full color signals using a suitable mask (not shown), and the binarized signal is coupled to the printer 82. Yellow is omitted from the combined processing because yellow dots are typically much lighter than cyan or magenta dots so that they are less visually perceptible than cyan or magenta dots.

The initial intensity values of each of the CMK full color signals has a range between 0 and 255. The values of the three initial intensity values of the CMK full color signals are added together by an adder 72, which supplies a total pixel value on its output line 73. The total pixel value (the CMK sum) on the output line 73 of the adder 72 is supplied to comparators 74, 75, and 76.

The CMK sum is compared to the value of 255 by the comparator 74, which provides a binary output selection signal to a selector 77 over an output line 78. The state of the binary output selection signal on the output line 78 controls the selector 77, which has output lines 79, 80, and 81 as inputs to an output device such as a color printer 82, for example.

Inputs to the selector 77 from output lines 83, 84, and 85 of an output generator 86 and from output lines 87, 88, and 89 of an output generator 90 determine whether at most one of the cyan, magenta, and black dots at the specific pixel location is printed by the color printer 82 or whether the color printer 82 prints at least one of the cyan, magenta, and black dots or both of the cyan and magenta dots at the specific pixel location according to whether the CMK sum is less than or equal to 255.

If the state of the binary output selection signal on the output line 78 indicates that the CMK sum is less than or equal to 255, at most one dot is caused to be placed at the specific pixel location by the output generator 90. The output generator 90 has inputs from the comparator 76, a comparator 91, and a comparator 92.

The comparator 91 compares the full color cyan signal on the output line 69 of the converter 68 with the threshold value (T) of a mask at the specific pixel location. The comparator 92 compares the sum of the full color cyan and black signals on an output line 93 of a cyan and black adder 94 with the threshold value (T) of the mask at the specific pixel location. The comparator 76 compares the total value of the full color cyan, magenta, and black signals on the output line 73 of the adder 72 with the threshold value (T) of the mask at the specific pixel location.

If the value of the signal on the output line 69 of the converter 68 is greater than the threshold value, the state of the binary signal on an output line 95 of the comparator 91 indicates that only a cyan dot is to be placed at the specific pixel location.

If the signal on the output line 69 of the converter 68 is not greater than the threshold value but the signal on the output line 93 of the adder 94 is greater than the threshold value, the state of the binary signal on an output line 96 of the comparator 92 indicates that a black dot only is to be placed at the specific pixel location.

If neither the value of the signal on the output line 69 of the converter 68 nor the value of the signal on the output line 93 of the adder 94 is greater than the threshold value but the signal on the output line 73 of the adder 72 is greater than the threshold value, the state of the binary signal on an output line 97 of the comparator 76 indicates that only a magenta dot is to be placed at the specific pixel location.

If none of the signals on the output line 69 of the converter 68, on the output line 93 of the adder 94, and on the output line 73 of the adder 72 has a value greater than the threshold value, the signals on the output lines 87–89 of the output generator 90 indicate that none of the cyan, magenta, and black dots is to be placed at the specific pixel location.

If the state of the output selection signal on the output line 78 of the comparator 74 indicates that the total value of the full color cyan, magenta, and black signals on the output line 73 of the adder 72 is greater than 255, at least one of the cyan, magenta, and black dots or one of each of the cyan and magenta dots is caused to be placed at the specific pixel location by the states of the binary signals on the output lines 83–85 of the output generator 86. The output generator 86 has inputs from the comparators 75, 91, and 92.

The comparator 75 compares the sum of the values of the full color cyan, magenta, and black with the threshold value plus 255 of the mask at the specific pixel location.

If the value of the signal on the output line 73 of the adder 72 is greater than the threshold value plus 255, the states of the binary signals on the output lines 83–85 of the output generator 86 indicate that one of each of the cyan and magenta dots is to be placed at the specific pixel location.

If the value of the signal on the output line 73 of the adder 72 is not greater than the threshold value plus 255 but the value of the signal on the output line 69 of the converter 68 is greater than the threshold value, the states of the binary signals on the output lines 83–85 of the output generator 86 indicate that only a cyan dot is to be placed at the specific pixel location.

If the value of the signal on the output line 73 of the adder 72 is not greater than the threshold value plus 255 and if the value of the signal on the output line 69 of the converter 68 is not greater than the threshold value, but the value of the signal on the output line 93 of the adder 94 is greater than the threshold value, the states of the binary signals on the output lines 83–85 of the output generator 86 indicate that only a black dot is to be placed at the specific pixel location.

If the value of the signal on the output line 73 of the adder 72 is not greater than the threshold value plus 255, if the value of the signal on the output line 69 of the converter 68 is not greater than the threshold value, and if the value of the signal on the output line 93 of the adder 94 is not greater than the threshold value, the states of the binary signals on the output lines 83–85 of the output generator 86 indicate that only a magenta dot is to be placed at the specific pixel location.

It should be understood that the apparatus of FIG. 1 could be used with the third embodiment with changes necessary for the third color plane. It should be understood that the apparatus of FIG. 2 could be used with the second embodiment with changes necessary for two color planes rather than the third color plane.

While the invention has been described with respect to a printer, it should be understood that the improved color distribution may be obtained with other output devices such as a color liquid crystal display, for example.

An advantage of this invention is that an improved color distribution is provided by an output device such as a binary color printer, for example. Another advantage of this invention is that improved color distribution is obtained with various halftoning techniques.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

In a fifth embodiment, this invention is applied to two color planes, namely cyan and magenta, by using a single, relatively expensive, error diffusion mechanism to decide where to place the output dots that are to be made visually pleasing and using a less expensive random number generator to make secondary decisions.

An output dot level DotLevel(x, y) is derived for each pixel location from the input color values at each location depending on the specified color. If C(x, y)+M(x, y)<=255, then DotLevel(x, y)=C(x, y)+M(x, y), the total number of individual cyan and magenta dots to be placed for such colors, otherwise DotLevel(x, y)=C(x, y)+M(x, y)−255, the total number of blue dots to be placed for such colors. The output dot level for a given color indicates the number of the most visually noticeable dots to be used in producing the color, and therefore represents the number of dots that are to be placed in a pleasing pattern. A single error diffusion is therefore performed on the output dot level data DotLevel(x, y), involving the modified output dot level values DotLevel (x, y)+DotLevel Error(x, y). The value DotLevel Error(x, y) represents the error propogated to location (x, y) as a result of the diffusion.

For colors such that C(x, y)+M(x, y)<=255, if the modified output dot level value is greater than the diffusion threshold, T(x, y), either a cyan or magenta dot, but not both, are placed at location (x, y). The single error diffusion will therefore determine where to place the correct total number of cyan and magenta dots, C(x, y)+M(x, y). To determine which colorant to place at a given location, once the diffusion algorithm has decided to place a dot of one of the colorants, a random number on the range 1 to C(x, y)+M(x, y) is generated. If the random number is on the range 1 to C(x, y) a cyan dot is placed, otherwise a magenta dot is placed. This guarantees that cyan and magenta dots are placed in the correct proportions. Other mechanisms can be used to elect to place a cyan dot with approximate probability C(x, y)/[C(x, y)+M(x, y)] or place a magenta dot with approximate probability M(x, y)/[C(x, y)+M(x, y)], and all such mechanisms are to be considered to be within the scope of this invention.

For colors such that C(x, y)+M(x, y)>255, if the modified output dot level value is greater than the diffusion threshold, T(x, y), both cyan and magenta dots are placed at location (x, y). For colors such that C(x, y)+M(x, y)>255, if the modified output dot level value is not greater than the diffusion threshold, T(x, y), either a cyan or a magenta dot is placed at location (x, y). The number of pixel locations at which cyan and not magenta dots are placed is C'(x, y)=255−M(x, y), and the number of pixel locations at which magenta and not cyan dots are placed is M'(x, y)=255−C(x, y). To determine which of only one colorant is to be placed at a given location a random number on the range 1 to C'(x, y)+M'(x, y) is generated. If the random number is on the range 1 to C'(x, y), a cyan dot is placed, otherwise a magenta dot is placed. This guarantees that cyan and magenta dots are placed in the correct proportions. Other mechanisms can be used to elect to place a cyan dot with approximate probability C'(x, y)/[C(x, y)+M(x, y)] or place a magenta dot with approximate probability M'(x, y)/[C'(x, y)+M'(x, y)], and all such mechanisms are to be considered to be within the scope of this invention.

The fifth embodiment is therefore processed according to the following steps, although some variation in the order will still produce desired results:

```
if (C(x, y) + M(x, y) <= 255)
{
    Dot Level(x, y) = C(x, y) + M(x, y)
    if (Dot Level(x, y) + Dot Level Error(x, y) > T)
    {
        if (RAND[C(x, y) + M(x, y)] <= C(x, y))
            print Cyan dot only
        else
            print Magenta dot only
        DError = 255 − (Dot Level(x, y) + Dot Level Error(x, y))
    }
    else
    {
        DError = 0 − (Dot Level(x, y) + Dot Level Error(x, y))
    }
}
else
{
    Dot Level(x, y) = C(x, y) + M(x, y) − 255
    if (Dot Level(x, y) + Dot Level Error(x, y) > T)
    {
        print both Cyan and Magenta dots
        DError = 255 − (Dot Level(x, y) + Dot Level Error(x, y))
    }
    else
    {
        if (RAND[512 − C(x, y) − M(x, y)] <= 255 − M(x, y))
            print Cyan dot only
        else
            print Magenta dot only
        DError = 0 − (Dot Level(x, y) + Dot Level Error(x, y))
    }
}
Dot Level Error(x + 1, y) = Dot Level Error(x + 1, y) − DError * 7/16
Dot Level Error(x − 1, y + 1) = Dot Level Error(x − 1, y + 1) − DError * 3/16
Dot Level Error(x, y + 1) = Dot Level Error(x, y + 1) − DError * 1/16
Dot Level Error(x + 1, y + 1) = Dot Level Error(x + 1, y + 1) − DError * 5/16
``` where RAND[x] is assumed to produce a uniformly distributed random integer on the range 1 to x.

In the sixth embodiment, this invention is applied to two color planes, namely cyan and magenta, by using a single error diffusion mechanism to decide where to place the output dots that are to be made visually pleasing and using a less expensive random number generator to make secondary decisions. The output dot level value, and therefore the pattern of output dots that are to be made visually pleasing, is determined in accordance with a new set of objectives.

Figure 3:
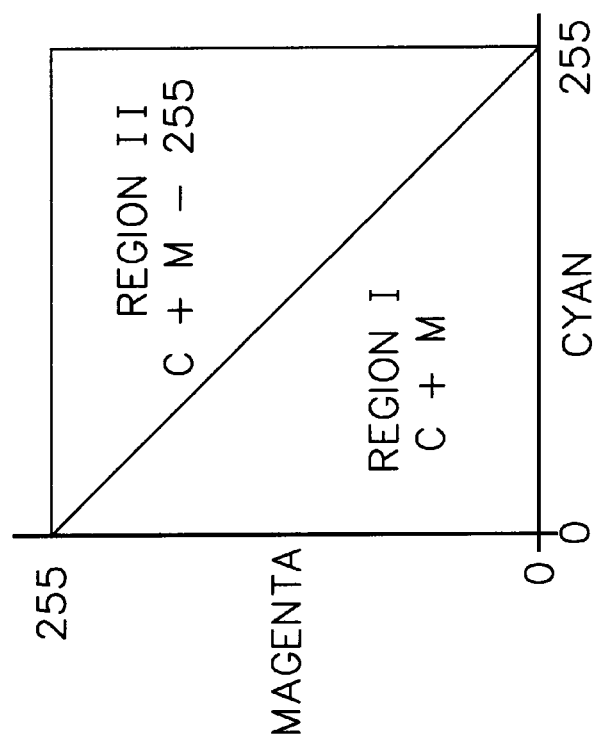
FIG. 3 is a diagrammatic illustration of the divisions of a two-dimensional color space in accordance with the first, second or fifth embodiment of the invention.

For prior embodiments, the two-dimensional space spanned by the cyan and magenta color coordinates has been divided into two regions according to FIG. 3. In region I, a pleasing pattern is made of the total number of cyan and magenta dots. In region II, a pleasing pattern is made of the total number of blue dots. Depending on the particular ink and paper combination used, a different division of the color space and a different definition of output dot level for each region may be appropriate. For example, for the color (C, M)=(254, 2), cyan can be considered the majority colorant and magenta the minority colorant. Due to imperfect dot formation, a magenta dot placed at a given pixel location without a cyan dot but surrounded by cyan dots can appear as blue as a a pixel location containing both cyan and magenta dots. Instead of producing a pleasing pattern of C+M−255 =254 +2 −255 =1 blue dots, it is then desireable to produce a pleasing pattern of the M=2 magenta dots.

Figure 4:
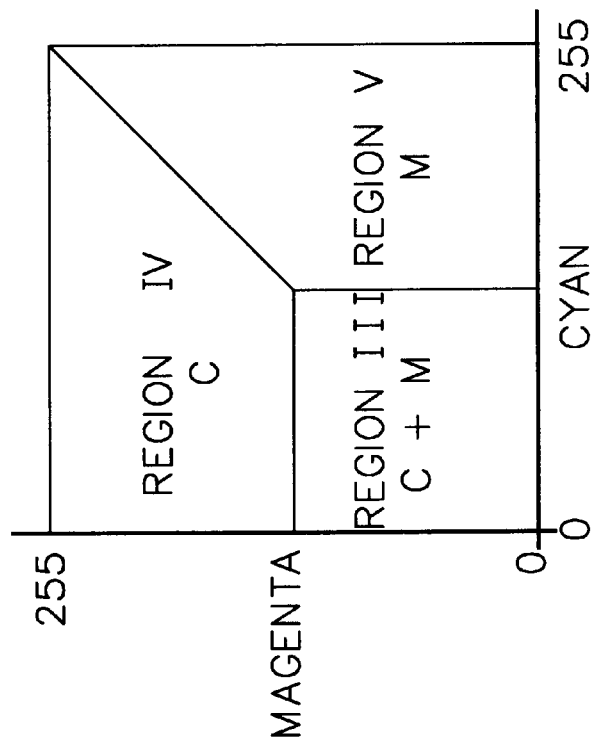
FIG. 4 is a diagrammatic illustration of the division of a two-dimensional color space in accordance with the sixth embodiment of the invention.

This suggests the division of the two-dimensional color space depicted in FIG. 4. For colors that lie in region III, such that both C<128 and M<128, the output dot level is defined as Dot Level(x, y)=C(x, y)+M(x, y). The output dot level is defined for region IV as Dot Level(x, y)=C(x, y) and the output dot level is defined for region V as Dot Level(x, y)=M(x, y). The selection between the use of a cyan or magenta dot for region III is determined by a random number generator as in the fifth embodiment. In region IV, error diffusion is used to determine the careful placement of the cyan dots. Many simpler mechanisms can be used to place the M(x, y) magenta dots at each location with probability M(x, y)/255. For example, a random number generator, or a threshold matrix, may be used. The operations performed for region V are symmetric with those for region IV.

The sixth embodiment is therefore processed according to the following steps, although some variation in the order will still produce desired results:

```
if (C(x, y) < 128 AND M(x, y) < 128)
{
    /* Region III */
    Dot Level(x, y) = C(x, y) + M(x, y)
    if (Dot Level(x, y) + Dot Level Error(x, y) > T)
    {
        if (RAND[C(x, y) + M(x, y)] <= C(x, y))
            print Cyan dot only
        else
            print Magenta dot only
        DError = 255 − (Dot Level(x, y) + Dot Level Error(x, y))
    }
    else
    {
        DError = 0 − (Dot Level(x, y) + Dot Level Error(x, y))
    }
}
else
{
    if (C(x, y) < M(x, y))
    {
        /* Region IV */
        Dot Level(x, y) = C(x, y)
        if (Dot Level(x, y) + Dot Level Error(x, y) > T)
        {
            place Cyan dot
            DError = 255 − (Dot Level(x, y) + Dot
            Level Error(x, y))
        }
        else
        {
            DError = 0 − (Dot Level(x, y) + Dot
            Level Error(x, y))
        }
        if (M(x, y) >= RAND[255])
        {
            place Magenta dot
        }
    }
    else
    {
        /* Region V */
        Dot Level(x, y) = M(x, y)
        if (Dot Level(x, y) + Dot Level Error(x, y) > T)
        {
            place Magenta dot
            DError = 255 − (Dot Level(x, y) + Dot
            Level Error(x, y))
        }
        else
        {
            DError = 0 − (Dot Level(x, y) + Dot
            Level Error(x, y))
        }
        if (C(x, y) >= RAND[255])
        {
            place Cyan dot
        }
    }
}
Dot Level Error(x + 1, y) = Dot Level Error(x + 1, y) − DError * 7/6
Dot Level Error(x − 1, y + 1) = Dot Level Error(x − 1, y + 1) −
DError * 3/16
Dot Level Error(x, y + 1) = Dot Level Error(x, y + 1) − DError * 1/16
Dot Level Error(x + 1, y + 1) = Dot Level Error(x + 1, y + 1) −
DError * 5/16
```

The particular division of the color space into regions and the definition of the output dot level for each region depends on the particular ink/paper interaction. Other divisions of the color space into two or more regions and definitions of the output dot level for each region are possible and are to be considered to be within the scope of this invention.

While the embodiments of the invention disclosed herein have been described with regard to halftoning, principles of the invention may be applied to reducing a number of levels of a color signal to a lesser number of levels. In addition, while "color" signals have been referred to herein, the invention is also applicable to signals indicative of different shades of a single color or of shades of gray.

Further, in discussing processing of signals on a pixel-by-pixel basis herein, there has been an implication that there is pixel correspondence from one color signal (or color plane) to another. However, systems may be envisioned that operate within the scope of the invention in which pixels of one plane are offset from those in another plane or are even or uneven multiples of one another.

What is claimed is:

1. A computerized method for producing an improved quality output representation of a color input image on a device that produces output colors by processing signals representing input pixels of the color input image including:
   determining a value in each color plane for each input pixel of the color image by adding the initial input value for each input pixel and an error correction value determined by the error correction at other pixels having predetermined locations relative to the input pixel so that a modified value is determined for each color for the input pixel;
   adding the modified values of at least two color planes for each input pixel of the color image;
   determining if a sum of the modified values for the input pixel exceeds a first threshold value;
   determining if the sum of the modified values for the input pixel exceeds a second threshold value greater than the first threshold value;
   using only one of the colors at the input pixel only if the first threshold value is exceeded by the sum of the modified values for the input pixel but the second threshold value is not exceeded;
   selecting a color to be used at the input pixel having the largest modified value when only one of the colors is to be used;
   and using each of the colors at the input pixel only if each of the first and second threshold values is exceeded by the sum of the modified values for the input pixel.

2. The method according to claim 1 in which the colors of at least the two color planes are cyan and magenta.

3. The method according to claim 1 in which the device is a color printer providing the output representation.

4. A computerized method for producing an improved quality output representation of a color input image on a device that produces output colors by processing signals representing input pixels of the color input image including:
   determining a value in each color plane for each input pixel of the color image by adding the initial input value for each input pixel and an error correction value determined by the error correction at other pixels having predetermined locations relative to the input pixel so that a modified value is determined for each color for the input pixel;

adding the modified values of at least three color planes for each input pixel of the color image;

determining if a sum of the modified values for the input pixel exceeds a first threshold value;

determining if the sum of the modified values for the input pixel exceeds a second threshold value greater than the first threshold value;

using only one of the colors at the input pixel only if the first threshold value is exceeded by the sum of the modified values for the input pixel;

selecting a color to be used at the input pixel having a modified value larger than the modified value of each of the other colors when only one of the colors is to be used but selecting another of the colors when none of the colors has a modified value larger than the modified value of each of the others;

and using two of the colors at the input pixel only if each of the first and second threshold values is exceeded by the sum of the modified values for the input pixel.

5. The method according to claim 4 in which the colors of at least the three color planes are cyan, magenta, and black.

6. The method according to claim 4 in which the device is a color printer providing the output representation.

7. A computerized method for producing an improved quality output representation of a color input image on a device that produces output colors by processing signals representing input pixels of the color input image including:

determining an initial value in each color plane for each input pixel of the color image;

adding the initial values of at least two color planes for each input pixel of the color image;

determining if a sum of the initial values for the input pixel exceeds a first threshold value;

determining if the sum of the initial values for the input pixel exceeds a second threshold value greater than the first threshold value;

using only one of the colors at the input pixel only if the first threshold value is exceeded by the sum of the initial values for the input pixel but the second threshold value is not exceeded;

selecting a color to be used at the input pixel having the largest initial value when only one of the colors is to be used;

and using each of the colors at the input pixel only if each of the first and second threshold values is exceeded by the sum of the initial values for the input pixel.

8. A computerized method for producing an improved quality output representation of a color input image on a device that produces output colors by processing signals representing input pixels of the color input image including:

determining an initial value in each color plane for each input pixel of the color image;

adding the initial values of at least three color planes for each input pixel of the color image;

determining if the sum of the initial values for the input pixel exceeds a first threshold value;

determining if the sum of the initial values for the input pixel exceeds a second threshold value greater than the first threshold value;

using only one of the colors at the input pixel only if the first threshold value is exceeded by the sum of the initial values for the input pixel;

selecting a color to be used at the input pixel having an initial value larger than the initial value of each of the other colors when only one of the colors is to be used but selecting another of the colors when none of the colors has an initial value larger than the initial value of each of the others;

and using two of the colors at the input pixel only if each of the first and second threshold values is exceeded by the sum of the initial values for the input pixel.

9. An apparatus for producing an improved quality output representation of a color input image on an output device that produces output colors including:

determining means for determining a value of the signals representing each of the input pixels of each of at least two color planes;

utilizing means for utilizing the determined value of the signals representing each of the input pixels of each of the color planes in conjunction with each other to determine if one of the colors is to be used in the output representation for a specific input pixel of each of the color planes and which color if only one color is to be in the output representation or if more than one of the colors is to be in the output representation for the one specific input pixel of each of the color planes and which colors if more than one color are to be in the output representation;

said determining means including means for determining the value in each color plane for each input pixel of the color image by adding the initial input value for each input pixel and an error correction value determined by the error correction at other pixels having predetermined locations relative to the input pixel so that a modified value is determined for each color for the input pixel;

adding means for adding the modified values of at least two color planes for each input pixel of the color image;

first ascertaining means for ascertaining if the sum of the modified values for the input pixel exceeds a first threshold value;

second ascertaining means for ascertaining if the sum of the modified values for the input pixel exceeds a second threshold value greater than the first threshold value;

said utilizing means using only one of the colors in the output representation for the input pixel only if the first threshold value is exceeded by the sum of the modified values for the input pixel but the second threshold value is not exceeded;

selecting means for selecting the color to be used in the output representation for the input pixel having the largest modified value when only one of the colors is to be used;

and said utilizing means using each of the colors in the output representation for the input pixel only if each of the first and second threshold value is exceeded by the sum of the modified values for the input pixel.

10. An apparatus for producing an improved quality output representation of a color input image on an output device that produces output colors including:

determining means for determining a value of the signals representing each of the input pixels of each of at least two color planes;

utilizing means for utilizing the determined value of the signals representing each of the input pixels of each of the color planes in conjunction with each other to determine if one of the colors is to be used in the output representation for a specific input pixel of each of the color planes and which color if only one color is to be in the output representation or if more than one of the colors is to be in the output representation for the one specific input pixel of each of the color planes and which colors if more than one color are to be in the output representation;

said determining means including means for determining the value in each color plane for each input pixel of the color image by adding an initial input value for each input pixel and an error correction value determined by the error correction at other pixels having predetermined locations relative to the input pixel so that a modified value is determined for each color for the input pixel;

adding means for adding the modified values of at least three color planes for each input pixel of the color image;

first ascertaining means for ascertaining if a sum of the modified values for the input pixel exceeds a first threshold value;

second ascertaining means for ascertaining if the sum of the modified values for the input pixel exceeds a second threshold value greater than the first threshold value;

said utilizing means using only one of the colors in the output representation for the input pixel only if the first threshold value is exceeded by the sum of the modified values for the input pixel but the second threshold value is not exceeded;

selecting means for selecting the color to be used in the output representation for the input pixel having a modified value larger than the modified value of each of the other colors when only one of the colors is to be used but selecting another of the colors when none of the colors has a modified value larger than the modified value of each of the others;

and said utilizing means using two of the colors in the output representation for the input pixel only if each of the first and second threshold values is exceeded by the sum of the modified values for the input pixel.

11. An apparatus for producing an improved quality output representation of a color input image on an output device that produces output colors including:

determining means for determining a value of the signals representing each of the input pixels of each of at least two color planes;

utilizing means for utilizing the determined value of the signals representing each of the input pixels of each of the color planes in conjunction with each other to determine if one of the colors is to be used in the output representation for a specific input pixel of each of the color planes and which color if only one color is to be in the output representation or if more than one of the colors is to be in the output representation for the one specific input pixel of each of the color planes and which colors if more than one color are to be in the output representation;

said determining means including means for determining the initial value in each color plane for each input pixel of the color image;

adding means for adding the initial values of at least two color planes for each input pixel of the color image;

first ascertaining means for ascertaining if the sum of the initial values for the input pixel exceeds a first threshold value in a location in a matrix corresponding to the location of the input pixel;

second ascertaining means for ascertaining if the sum of the initial values for the input pixel exceeds a second threshold value greater than the first threshold value and in a location in a matrix corresponding to the location of the input pixel;

said utilizing means using only one of the colors in the output representation for the input pixel only if the first threshold value is exceeded by the sum of the modified values for the input pixel but the second threshold value is not exceeded;

selecting means for selecting the color to be used in the output representation for the input pixel having the largest initial value when only one of the colors is to be used;

and said utilizing means using only one of the colors in the output representation for the input pixel only if the first threshold value is exceeded by the sum of the modified values for the input pixel but the second threshold value is not exceeded.

12. An apparatus for producing an improved quality output representation of a color input image on an output device that produces output colors including:

determining means for determining a value of the signals representing each of the input pixels of each of at least two color planes;

utilizing means for utilizing the determined value of the signals representing each of the input pixels of each of the color planes in conjunction with each other to determine if one of the colors is to be used in the output representation for a specific input pixel of each of the color planes and which color if only one color is to be in the output representation or if more than one of the colors is to be in the output representation for the one specific input pixel of each of the color planes and which colors if more than one color are to be in the output representation;

said determining means including means for determining the initial value in each color plane for each input pixel of the color image;

adding means for adding the initial values of at least three color planes for each input pixel of the color image;

first ascertaining means for ascertaining if the sum of the initial values for the input pixel exceeds a first threshold value in a location in a matrix corresponding to the location of the input pixel;

second ascertaining means for ascertaining if the sum of the initial values for the input pixel exceeds a second threshold value greater than the first threshold value and in a location in the matrix corresponding to the location of the input pixel;

said utilizing means using only one of the colors in the output representation for the input pixel only if the first threshold value is exceeded by the sum of the modified values for the input pixel but the second threshold value is not exceeded;

selecting means for selecting the color to be used in the output representation for the input pixel having an initial value larger than the initial value of each of the other colors when only one of the colors is to be used but selecting another of the colors when none of the colors has an initial value larger than the initial value of each of the others;

and said utilizing means using two of the colors in the output representation for the input pixel only if each of the first and second threshold values is exceeded by the sum of the initial values for the input pixel.

* * * * *